United States Patent [19]

Lange

[11] 4,335,947
[45] Jun. 22, 1982

[54] CAMERA SHUTTER ASSEMBLY

[75] Inventor: Karl-Heinz Lange, Bünde, Fed. Rep. of Germany

[73] Assignee: Balda-Werke Photographische Geräte und Kunststoff GmbH & Co., KG, Bünde, Fed. Rep. of Germany

[21] Appl. No.: 208,742

[22] Filed: Nov. 20, 1980

[30] Foreign Application Priority Data

Nov. 21, 1979 [DE] Fed. Rep. of Germany ....... 2946876
Nov. 3, 1980 [DE] Fed. Rep. of Germany ....... 3041208

[51] Int. Cl.³ ........................... G03B 9/08; G03B 9/02
[52] U.S. Cl. ..................................... 354/230; 354/274
[58] Field of Search ................... 354/230, 270–274, 354/232–235

[56] References Cited

U.S. PATENT DOCUMENTS

| 3,136,236 | 6/1964 | Hartl | 354/274 |
| 3,366,024 | 1/1968 | Starp | 354/274 |
| 3,935,581 | 1/1976 | Starp | 354/270 |
| 4,009,946 | 3/1977 | Geyer | 354/274 X |

FOREIGN PATENT DOCUMENTS

| 1144104 | 8/1963 | Fed. Rep. of Germany . | |
| 1162683 | 2/1964 | Fed. Rep. of Germany | 354/230 |
| 1472569 | 2/1965 | Fed. Rep. of Germany . | |
| 1120268 | 1/1967 | Fed. Rep. of Germany . | |
| 1232464 | 1/1967 | Fed. Rep. of Germany . | |
| 1297465 | 1/1970 | Fed. Rep. of Germany . | |
| 1497894 | 3/1971 | Fed. Rep. of Germany . | |
| 299692 | 6/1972 | Fed. Rep. of Germany . | |
| 2251758 | 10/1972 | Fed. Rep. of Germany . | |
| 2642005 | 3/1977 | Fed. Rep. of Germany . | |
| 2850734 | 6/1980 | Fed. Rep. of Germany . | |
| 362598 | 7/1962 | Switzerland | 354/271 |

OTHER PUBLICATIONS

Das grosse Baustoff-Lexikon, R. Stegemann, Deutsch Verlags-Anstatlt Stuttgart Berlin 1941, pp. 526-529.
Buch: Taschenbuch Feingerattetechnik, Band 2, VEB Verlag Technik, Berlin p. 580.

Primary Examiner—Donald A. Griffin
Attorney, Agent, or Firm—Blum, Kaplan, Friedman, Silberman & Beran

[57] ABSTRACT

A camera leaf shutter assembly having at least one activation ring rotatable about a stationary carrier ring for operating the shutter assembly is provided. The number of individual parts of the assembly is reduced and assembly is facilitated by forming the activation ring and carrier ring of a synthetic material.

The carrier ring is formed with a groove for receiving the activation ring with the groove walls securing the activation ring in the radial direction. The camera ring is formed with securing elements for securing the activation ring in the axial direction. The securing element may be a bayonet-type closure or deformable tabs biased toward the axis of the assembly. In a preferred embodiment the shutter blades are pivotably mounted between two activation rings, the activation rings and shutter blades disposed within a shutter chamber formed by an outer ring cooperating with the camera ring for securing the assembly.

19 Claims, 6 Drawing Figures

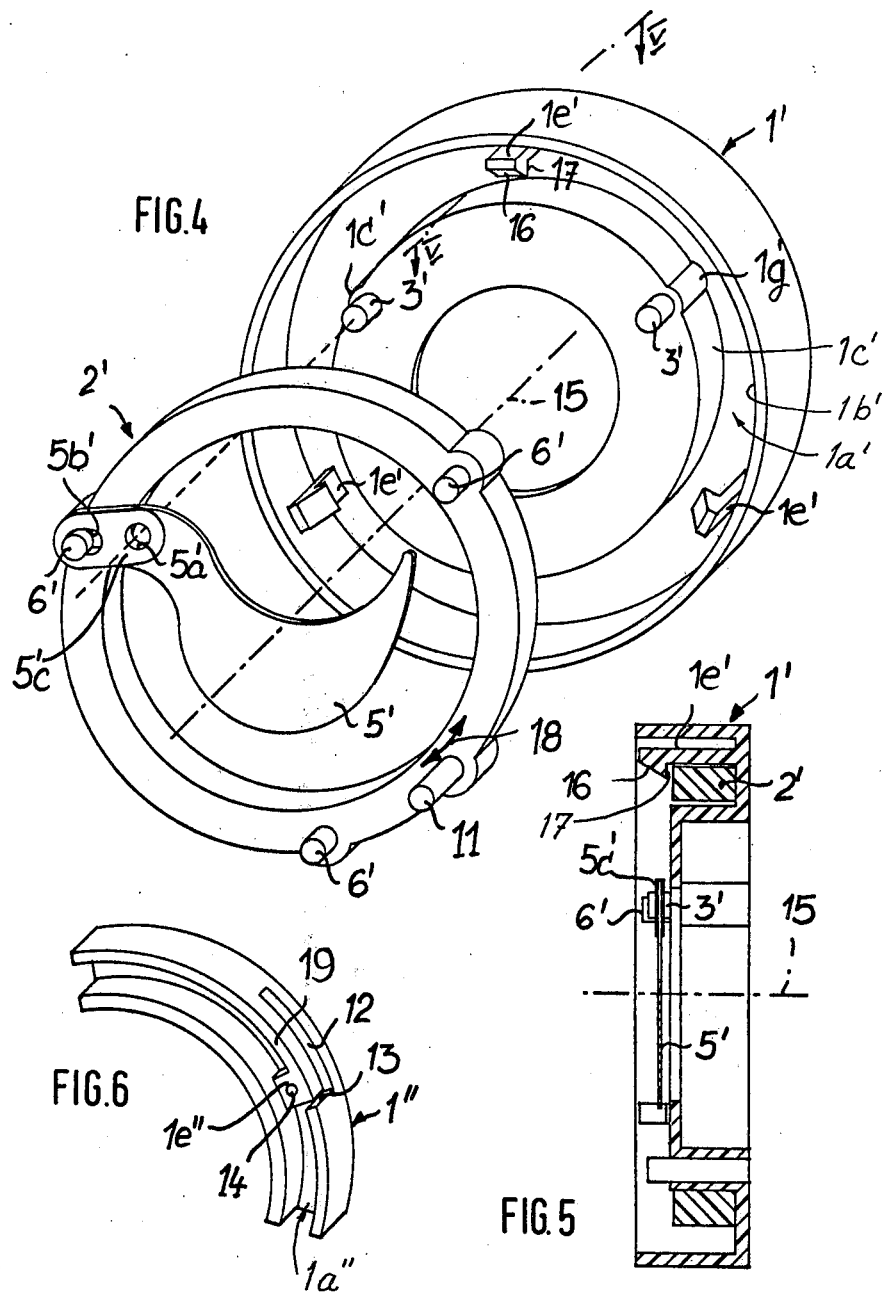

CAMERA SHUTTER ASSEMBLY

BACKGROUND OF THE INVENTION

This invention relates generally to a camera shutter, and particularly to a camera shutter with shutter leaves pivotably mounted on at least one activation ring rotatably mounted about a stationary carrier ring.

In the known camera leaf shutters, the shutter assembly may be constructed in the same manner as a diaphragm for closing the lens aperture. Activation of the shutter is accomplished by utilizing metal activation rings having riveted hinge pins or activation pins mounted thereon for engaging the metal shutter blades. The manufacture of these individual parts as well as their assembly involves considerable expense. In addition, in these known shutters, additional costly steps must be taken in order to insure that the activation rings do not move in an axial or radial direction. Such a construction is illustrated in German DE-AS No. 1,222,369.

Accordingly, it is desirable to provide a camera shutter assembly of the leaf-type which will require the least number of individual parts, that will be easy and inexpensive to manufacture and, especially easy to assemble.

SUMMARY OF THE INVENTION

A camera leaf shutter assembly with shutter leaves pivotably mounted on at least one activation ring which is rotatably mounted about a stationary carrier ring is provided. The activation ring is engaged in a circular groove in the carrier ring so that the inner and outer groove walls prevent displacement of the activation ring in the radial direction. Displacement in the axial direction is prevented by securing elements, such as a bayonet-type closure between the activation ring and the carrier ring, elongated locking tabs extending parallel to the axis or deformable tabs biased towards the axis and overlying the groove.

In a first embodiment of the invention, the shutter assembly includes two co-axially mounted activation rings assembled on both sides of substantially planar shutter blades. The shutter blades are oscillatably mounted on a support pin fixed on one activation ring and include a slit tapering in the direction of the center of the aperture for receiving an activation pin mounted on the opposed activation ring. The support pins and the activation pins are alternatively disposed on a circle of the same radius so that the regions of the activation rings opposed to the free ends of the pins include grooves for receiving the free ends of the pins for permitting the rings to slide past each other during operation of the shutter.

An additional closing carrier ring adapted to cooperate with the stationary carrier ring encloses the activation rings and shutter leaves for forming a shutter compartment. As the activation rings bearing support pins rotate in opposed directions, the shutter blade grooves and pins operate in camming fashion causing the shutter blades to oscillate for operating the shutter assembly.

Accordingly, it is an object of the invention to provide an improved camera shutter.

It is another object of the invention to provide an improved camera leaf shutter assembly with shutter blades oscillatably mounted on at least one activation ring which is slideably engaged in a stationary carrier ring.

It is a further object of the invention to provide an improved camera shutter assembly having at least one activation ring and a stationary carrier ring formed of a synthetic material.

Yet another object of the invention is to provide an improved camera leave shutter assembly having a bayonet-type coupling for mounting an activation ring on a stationary carrier ring.

Yet another object of the invention is to provide an improved camera ring shutter assembly including two co-axially mounted activation rings assembled on opposed sides of substantially planar shutter blades.

Still another object of the invention is to provide a camera leaf shutter assembly including camera blades mounted on activation rings within a shutter compartment formed by a stationary carrier ring and opposed cooperating closing ring.

Still a further object of the invention is to provide improved camera leaf shutter assembly wherein an activation ring is secured on a carrier ring by elongated locking tabs extending axially.

A further object of the invention is to provide an improved camera shutter assembly wherein an activation ring is secured on a carrier ring by inwardly biased tabs.

Another object of the invention is to provide an improved camera leave shutter assembly having a reduced number of individual parts for facilitating assembly of the shutter.

Still other objects and advantages of the invention will in part be obvious and will in part be apparent from the specification.

The invention accordingly comprises a product possessing the features, properties, and the relation of components which will be exemplified in the product hereinafter described, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 4 is an exploded perspective view of another embodiment of a camera leaf shutter assembly constructed in accordance with the invention;

FIG. 5 is a cross-sectional view along plane V—V of FIG. 4, illustrating the shutter in an assembled state;

FIG. 6 is a section of a carrier ring of the type illustrated in FIG. 4 constructed in accordance with yet another embodiment of a supporting element in accordance with the invention.

DESCRIPTION OF THE PREFERRED EMBODIMENTS

Figure 1:
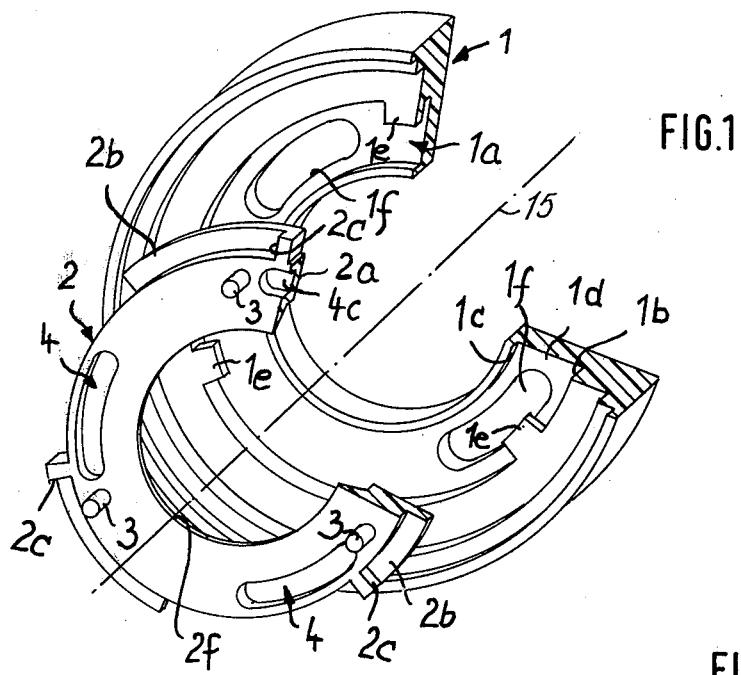
FIG. 1 is an exploded perspective view, partially cut, of a camera leaf shutter assembly including a stationary carrier ring and an aperature ring in accordance with the invention.

Referring now to FIG. 1, an exploded perspective view, partially cut, of a stationary carrier ring 1 coaxially mounted in the objective tube (not shown) of a camera is shown. Carrier ring 1 is formed with an annular groove 1a on the front surface thereof. Groove 1a has a radial outer wall 1b, an opposed radial inner wall 1c and a base 1d. A first activation ring, aperature ring 2 formed with a protruding sliding section 2a dimensioned to cooperate with groove 1a is inserted in groove 1a of carrier ring 1. Groove 1a of carrier ring 1 is also formed with securing elements for retaining aperture ring 1 in groove 1a and preventing displacement of aperture ring 1 in an axial direction.

In this embodiment of the invention, carrier ring 1 is formed with three inwardly facing tabs 1e which protrude inward from outer wall 1b over the surface of base 1d of groove 1a which latch onto a corresponding number of annular outwardly extending flange sections 2b provided in cooperating regions of aperture ring 2. Flange sections 2b are formed with ends having an abutting area 2c for limiting rotation of aperture ring 2 as flange sections 2b engage tabs 1e. Construction of carrier ring 1 with tabs 1e for engaging flange sections 2b of aperature ring 2 provides for latching carrier ring 1 and aperature ring 2 in bayonet-type fashion.

Aperature ring 2 is provided with three supporting pins 3 evenly distributed about a circle at the periphery on which three shutter leaves 5—of which only one is illustrated—are mounted in an oscillatable manner. Aperature ring 2 is also provided with three grooves 4 on the same radius as supporting pins 3. Each groove 4 has a base 4c at a fixed distance from the front side of aperature ring 2 as grooves 4 do not pass completely through aperature ring 2. Stationary carrier ring 1 is also formed with at least one traverse opening 1f which permits the passing through of elements needed for operating the activation rings and shutter assembly (not shown).

Figure 2:
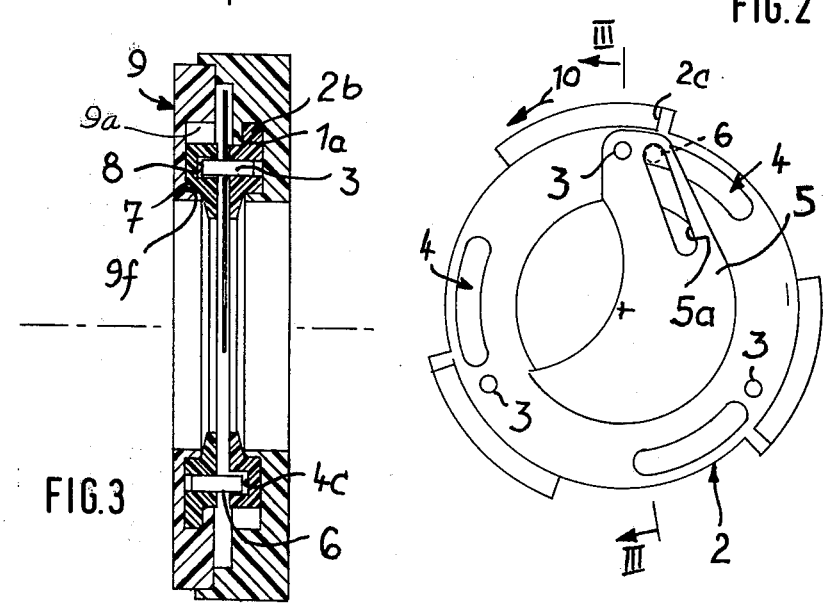
FIG. 2 is a front elevational view of the aperture ring of the camera leaf shutter assembly of FIG. 1 with one of three shutter blades illustrated.

Referring now to FIG. 2, one of three shutter blades 5 is shown. Shutter blade 5 is mounted oscillatably on supporting pin 3 which is fixed to aperature ring 2. Each shutter blade 5 is formed with a longitudinal slit 5a which extends from the circle of pins 3 to the direction of the axis of the shutter assembly. An activation pin 6 fixed on a closing ring 7 passes through slit 5a as shown in phantom in FIG. 2 and in the cross-section of FIG. 3. Activation pin 6 traverses shutter blade 5 through slit 5a, and the free end of activation pin 6 falls into groove 4 of aperature ring 2.

Figure 3:
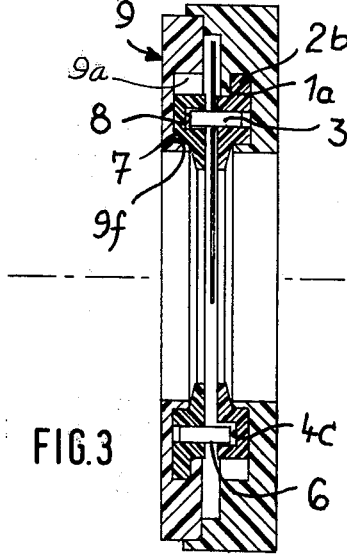
FIG. 3 is a cross-sectional view taken along plane III—III of FIG. 2.

Referring specifically to FIG. 3, closing ring 7 is formed in the same manner as aperature ring 2 so as to cooperate therewith. Closing ring 7 is also formed with elongated groove regions 8 which corresponds to grooves 4. Supporting pins 3 mounted in aperature ring 2 and lying opposite grooves 8 extend into grooves 8 when the shutter assembly is assembled as illustrated in the cross-section in FIG. 3. When closing ring 7 is rotated in a counter-clockwise direction, shutter blades 5 return from an open position to a closed position.

The shutter assembly also includes an outer ring 9 which cooperates with carrier ring 1 for forming a shutter compartment for receiving and retaining the shutter elements and activation rings. Outer ring 9 is formed with an annular groove 9a and inwardly extending tabs 9e for receiving closing ring 7 in bayonet fashion in similar fashion as carrier ring 1 engages aperature ring 2.

When the device is assembled, the free ends of supporting pins 3 on which shutter blades 5 are oscillatably mounted extend into grooves 8 in closing ring 7. Similarly, activation pins 6 mounted in closing ring 7 extend through slits 5a of shutter blades 5 so that the free ends thereof extend into grooves 4 of aperature ring 2. The two assembled activation rings, aperature ring 2 and closing ring 7, are initially placed in a first position towards the clockwise direction. On release of the shutter assembly, opening ring 2 is rotated in a counter-clockwise direction as shown by arrow 10. At this time, the position of activation pins 6 remains unchanged whereby shutter blades 5 are turned outwardly for opening the shutter. From this opened position, a subsequent twisting motion of closing ring 7 also in the counter-clockwise direction of arrow 10 causes shutter blades 5 to be returned to the closing position as illustrated in FIG. 2.

Shutter blades 5 are mounted securely between the opposed surfaces of aperture ring 2 and closing ring 7 thereby providing a fixed distance between the activation rings. The width of such an arrangement depends on the form of carrier ring 1 and outer ring 9 which latch into each other concentrically. Radial inner wall 1c of annular groove 1a forms the center and guiding surface for an inner bearing surface 2f of aperture ring 2. A corresponding central and guiding surface is provided on a bearing surface 9f of outer ring 9 for closing ring 7.

By constructing and arranging the shutter assembly in this manner as described, the axial as well as the radial guiding elements can be manufactured as a single piece in an extrusion device. This calls for a highly precise structure of the extruded part which depends on the degree of precision of the selected extruding devices.

While providing the securing elements for a bayonet-type coupling between carrier ring 1 and aperature ring 2 is satisfactory for attaining the objects recited above, it is also desirable to provide alternative couplings which occupy less space. The large area of the coupling members do not function after assembly as they are not involved in operation of the shutter. This large volume cannot be used for possible mounting sites for additional pins, electronic components, wire connections or the like. Thus, the camera designer is limited in construction possibilities in view of the various connections required in a shutter assembly.

FIGS. 4 and 5 show another space-saving embodiment in accordance with the invention and FIG. 6 shows a further modification of the embodiment illustrated in FIG. 4. In each of the embodiment of FIGS. 4 and 5, corresponding elements have been identified with the same reference numerals primed as utilized in describing the embodiment illustrated in FIGS. 1-3. Similarly, in the embodiment illustrated in FIG. 6 further modifications are illustrated by double primed reference numerals.

Referring now to FIGS. 4 and 5, a carrier ring 1' formed as a ringed body with a central aperature on an optical axis 15 is shown. Carrier ring 1' includes an annular groove 1a' having a radial outer wall 1b', a radial inner wall 1c', and a base 1d''. Inner wall 1c' includes three bearing points 1g' formed with an outwardly curved surface on which an activation ring 2' is fixed and axially guided. The outer edge of carrier ring 1' includes three equally spaced securing elements 1e' that extend parallel to the objective axis. Securing elements 1e' correspond to inward tabs 1e in the embodiment illustrated in FIGS. 1-3. Securing elements 1e' are formed as a locking tab having a head region with an inclined surface 16 which forms the forward portion of a latch 17 which extends inwardly towards the axis.

In addition to bearing points 1g', carrier ring 1' is also provided with three fixed supporting pins 3' on a circle. Three shutter blades 5', one of which is illustrated in FIG. 4, are oscillatably mounted on supporting pins 3' through an aperature 5a'. Shutter blades 5 also include at the outer end a reinforcing flange 5c' which is disposed on both sides of shutter blades 5b'. At the outer end of reinforcing flanges 5c', an elongated slot 5b' is provided on each shutter blade.

When the device of FIGS. 4 and 5 is assembled, the forward part of activation ring 2' shown in FIG. 1 is disposed behind latch 17 on securing elements 1e'. Supporting pins 3' pass through aperatures 5a' of each blade 5' which are equidistantly spaced about the periphery of activation ring 2'. Three shutter activation pins 6', distributed about the periphery of activation ring 2' on a circle of larger radius than supporting pins 3', pass through elongated slots 5b' of each blade 5'.

The shutter assembly illustrated in FIGS. 4 and 5 operates as follows. Activation ring 2' is moveable within runner groove 1a in either direction as illustrated by two sided arrow 18 by a shutter release activation mechanism (not shown). Activation ring 2' is first displaced in a clockwise direction with respect to carrier ring 1' so that shutter blades 5' pivot about supporting pins 3' in an outward direction for opening the shutter. Activation ring 2' is then turned in a counter-clockwise direction for returning shutter blades 5' to a closed position as illustrated in FIG. 5.

Referring now to FIG. 6, a modification of the supporting elements for securing activation ring 2' to a carrier ring 1" is shown. In this embodiment of the invention, securing elements 1e" are formed from regions of the outer wall of carrier ring 1". A slit 12 which tapers vertically towards objective axis 15 and a vertical slit 13 along the outer wall of carrier ring 1 forms an inwardly biased spring region 19 for holding tab element 1e". An assembly opening 14 is formed in supporting tab element 1e". This permits a hook element to be inserted therein making it possible to displace supporting element 1e" outwardly from optical axis 15 so that activation ring 2' can be placed onto groove 1a" of carrier ring 1". After mounting activation ring 2' therein, supporting element 1e" is released and biased toward axis 15 for insuring that activation ring 2' cannot be displaced axially in a similar manner as illustrated in the embodiment of FIG. 5.

Assembly of a shutter device constructed and arranged in accordance with these latter embodiments of the invention is indeed simplified. All that is necessary is simply to assemble the extruded elements of synthetic material and the shutter leaves. The activation rings carrying the shutter leaves can then simply be inserted onto the annular grooves of stationary carrier rings. In the earlier embodiment of the invention, wherein the activation ring and carrier ring engage each other in bayonet fashion, one merely places the shutter blades on the activation ring as a first step and then places the activation ring inside the stationary carrier ring and twists it in under the side tabs which prevents the rings from separating.

In the embodiment of the invention having a radially biased securing element, the activation ring is merely slipped into the runner groove in the carrier ring without twisting. In this form of construction, the supporting elements can be formed so as to save space and permit reduction in the size of the device. This may also be advantageous when a manufacturer wishes to provide accessory equipment in the shutter device, such as additional mechanical or electronic elements, wire connections or the like. It is also significant that in the shutter devices constructed and arranged in accordance with the invention, the mating sliding surfaces are each formed of synthetic material which is wear-resistant. Thus, shutter devices constructed and arranged in accordance with the invention are long lasting.

It will thus be seen that the objects set forth above, among those made apparent from the proceding description, are efficiently attained and, since certain changes may be made in the above product without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. In a camera leaf shutter assembly having a central axis in common with the objective axis including a stationary carrier ring, at least one activation ring rotatably mounted on the carrier ring and shutter blades oscillatably mounted on the activation ring, the improvement which comprises forming the carrier ring with an annular groove having a radial inner wall and a radial outer wall for receiving the activation ring, the outer wall including means for securing an activation ring in said annular groove and the carrier ring and activation ring of a synthetic material.

2. The camera shutter assembly of claim 1, wherein said means for securing includes a plurality of rigid tabs extending inwardly over a portion of said groove and the activation ring includes a plurality of outwardly extending annular flange regions for cooperatively engaging said side tabs for preventing displacement of said activation ring in an axial direction.

3. The camera shutter assembly of claim 2, wherein said flange regions include stop regions for abutting the tabs when activation ring and carrier ring engage each other in bayonet-type fashion whereby the activation ring will not be displaced along the axial direction.

4. The camera shutter assembly of claim 3, further including two coaxially mounted activation rings assembled on opposed sides of the shutter blades.

5. The camera shutter assembly of claim 4, wherein the first of said activation rings is an aperature ring including support pins disposed on a circle, said shutter blades oscillatably mounted on said support pins and having an elongated slit orientated towards the optical axis when in a shutter-closed position, the second of said activation rings being an opposed closing ring having a plurality of activation pins corresponding to the number of shutter blades, said activation pins passing through said elongated slits for oscillating said shutter blades between an opened and a closed position in response to annular displacement of said aperature ring and closing ring with respect to each other.

6. The camera shutter assembly of claim 5, wherein the regions of the aperature ring and closing ring opposed to the activation pins and support pins, respectively, include elongated grooves along the circle of said pins for receiving the free ends of said pins extending through said shutter blades.

7. The camera shutter assembly of claim 6, further including an outer ring for slideably receiving said closing ring, said outer ring adapted to cooperate with said carrier ring for forming a shutter compartment enclosing the activation ring and shutter blades therein.

8. The camera shutter assembly of claim 1, wherein said means for securing includes deformable means for engaging and retaining said activation ring in said groove.

9. The camera shutter assembly of claim 8, wherein said deformable means includes a plurality of flexible tabs extending axially from the outer wall of said groove and including a latch portion extending over a portion of said groove for retaining said activation ring therein.

10. The camera shutter assembly of claim 8, wherein said deformable means includes a spring tab biased towards said axis and extending over said groove which is displaceable away from said axis for inserting said activation ring in said groove and released to bias towards said axis for retaining the activation ring in said groove.

11. The camera shutter of claim 10, wherein said spring tab includes an opening for receiving an assembly tool for facilitating displacing said tab away from said axis for inserting the activation ring into said groove.

12. The camera shutter assembly of claim 10, wherein the outer wall of the groove of the carrier ring includes an axial slit and a radial slit for forming the spring tab configuration.

13. The camera shutter assembly of claims 9 or 10, including one activation ring, support pins mounted on said carrier ring and disposed on a circle, said shutter blades oscillatably mounted on said support pin, an activation pin for each shutter blade mounted in said activation ring and extending through said slits for operating the shutter in response to rotation of said activation ring with respect to said carrier ring.

14. The camera shutter assembly of claim 13, including three shutter blades, three supporting pins and three activation pins.

15. The camera shutter assembly of claim 14, wherein the base of said shutter blades in the region on said slit is reinforced.

16. The camera shutter assembly of claim 1 wherein the means for retaining the activation ring within the groove in the carrier ring is a plurality of elements equidistantly spaced about the circumference of the carrier ring groove.

17. The camera shutter assembly of claim 16, including three elements for retaining the activation ring.

18. The camera shutter assembly of claim 1, wherein the inner wall of said groove includes protruding bearing regions for sliding against the inner edge of said activation ring.

19. The camera shutter assembly of claim 1, wherein the outer edge of said activation ring includes protruding bearing region for sliding against the outer wall of said groove in said activation ring.

* * * * *